(12) United States Patent
Hirata

(10) Patent No.: US 7,177,088 B2
(45) Date of Patent: Feb. 13, 2007

(54) COMPACT OBJECTIVE OPTICAL SYSTEM AND EXAMINATION APPARATUS

(75) Inventor: Tadashi Hirata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/353,030

(22) Filed: Feb. 14, 2006

(65) Prior Publication Data

US 2006/0215282 A1 Sep. 28, 2006

(30) Foreign Application Priority Data

Feb. 17, 2005 (JP) ............................. 2005-041130

(51) Int. Cl.
G02B 21/02 (2006.01)
(52) U.S. Cl. .................... 359/659; 359/764; 600/101; 600/160; 600/162; 600/167; 600/176
(58) Field of Classification Search ........ 359/656–660, 359/714, 766, 764; 600/101, 160, 162, 167, 600/176–178
See application file for complete search history.

(56) References Cited

U.S. PATENT DOCUMENTS 6,674,582 B2 * 1/2004 Kawasaki .................. 359/690

2004/0051957 A1 3/2004 Liang

FOREIGN PATENT DOCUMENTS

JP 2004-313772 11/2004

* cited by examiner

Primary Examiner—Evelyn A. Lester
(74) Attorney, Agent, or Firm—Pillsbury Winthrop Shaw Pittman LLP

(57) ABSTRACT

By reducing the outer diameter, increasing the overall length, and correcting chromatic aberration well, the invention realizes an objective optical system and examination apparatus that are suitable for in-vivo examination with a sufficiently increased length and widened observation range. The invention provides a compact objective optical system and an examination apparatus comprising, in order from an object side: a first lens group having positive power; a second lens group including a compound lens; a third lens group formed of a biconvex lens; a fourth lens group having positive power and including a compound lens; and a fifth lens group having positive power. Joining surfaces of the compound lens included in the second lens group and the compound lens included in the fourth lens group have negative power.

19 Claims, 15 Drawing Sheets

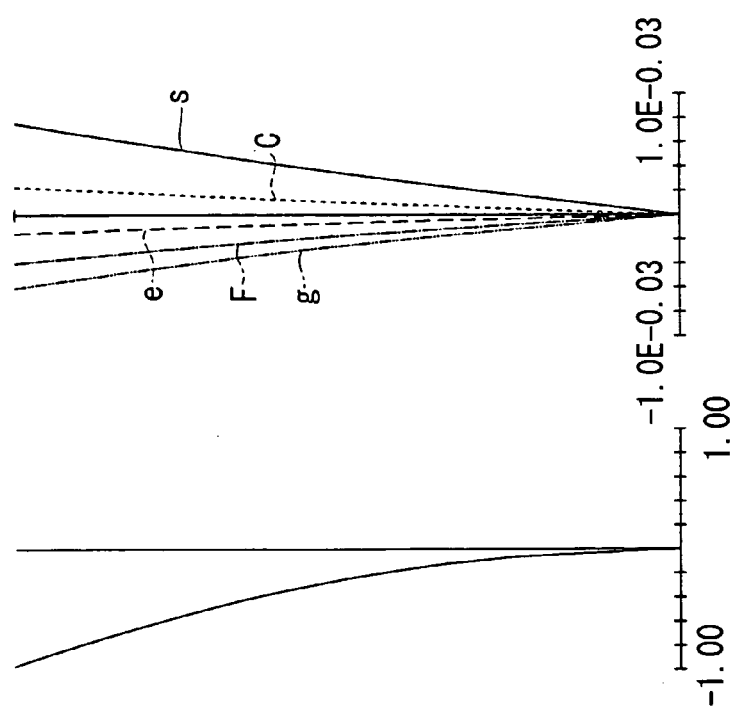

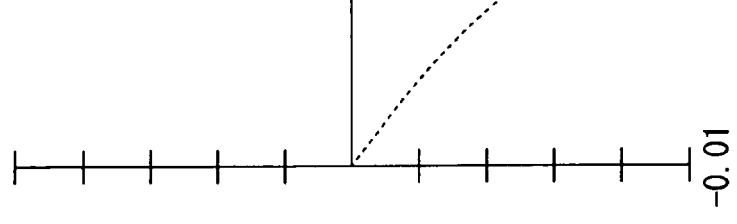
FIG. 5F COMATIC ABERRATION (S) y=0.34
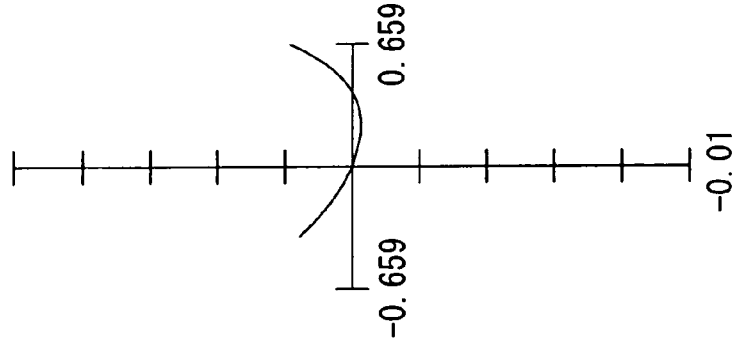
FIG. 5E COMATIC ABERRATION (M) y=0.34

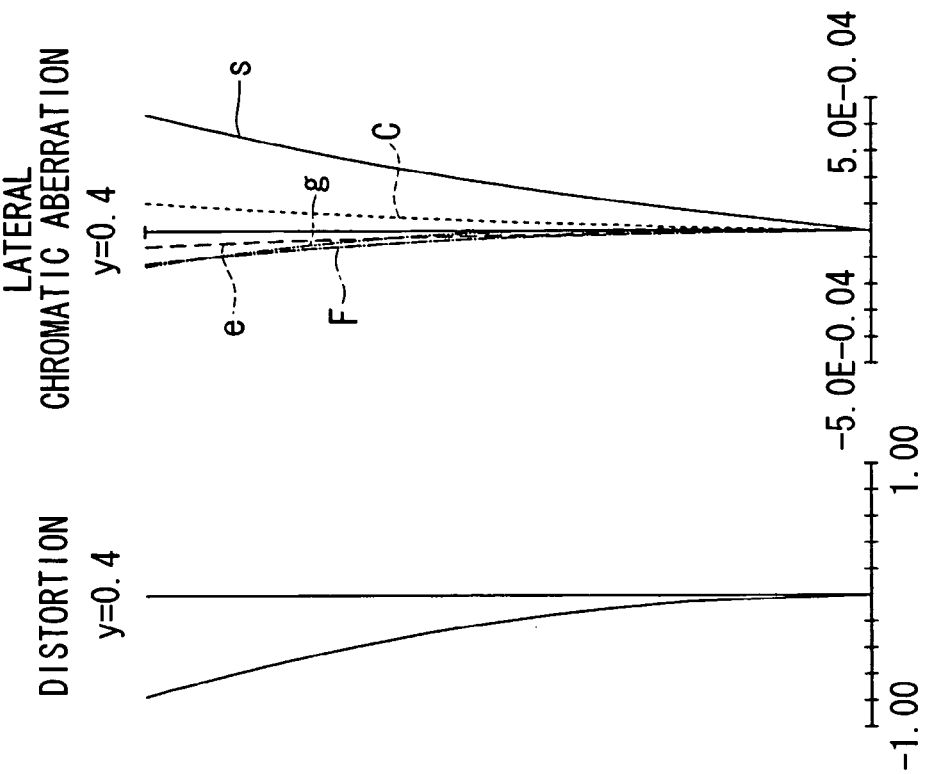
FIG. 7A  SPHERICAL ABERRATION IMAGE SIDE NA0.125
FIG. 7B  ASTIGMATISM MsSd y=0.4
FIG. 7C  DISTORTION y=0.4
FIG. 7D  LATERAL CHROMATIC ABERRATION y=0.4

COMATIC ABERRATION (S)
y=0.4

COMATIC ABERRATION (M)
y=0.4

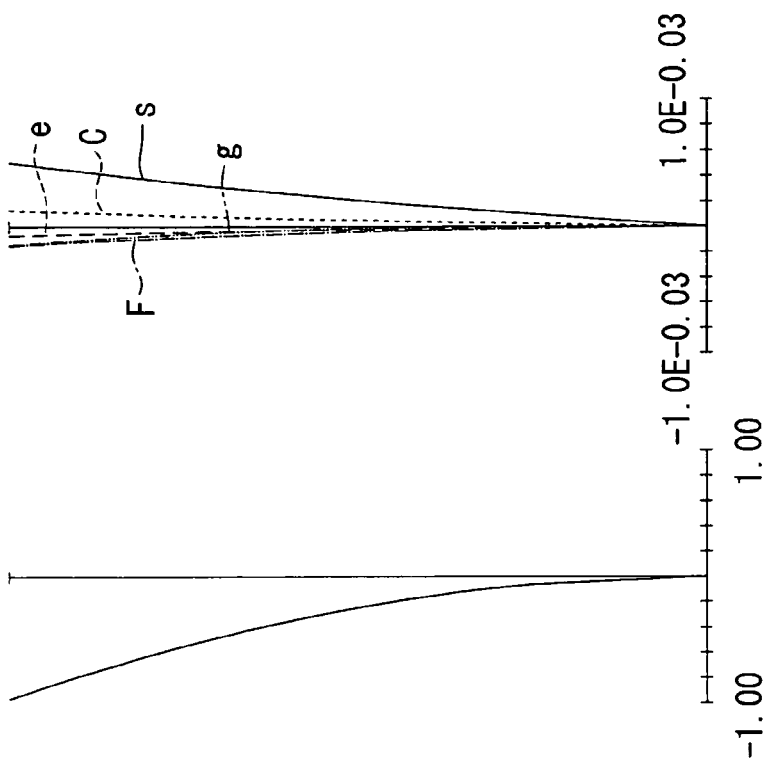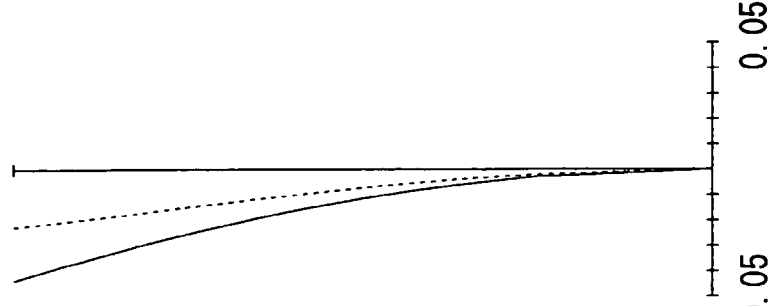

COMATIC ABERRATION (S)

COMATIC ABERRATION (M)

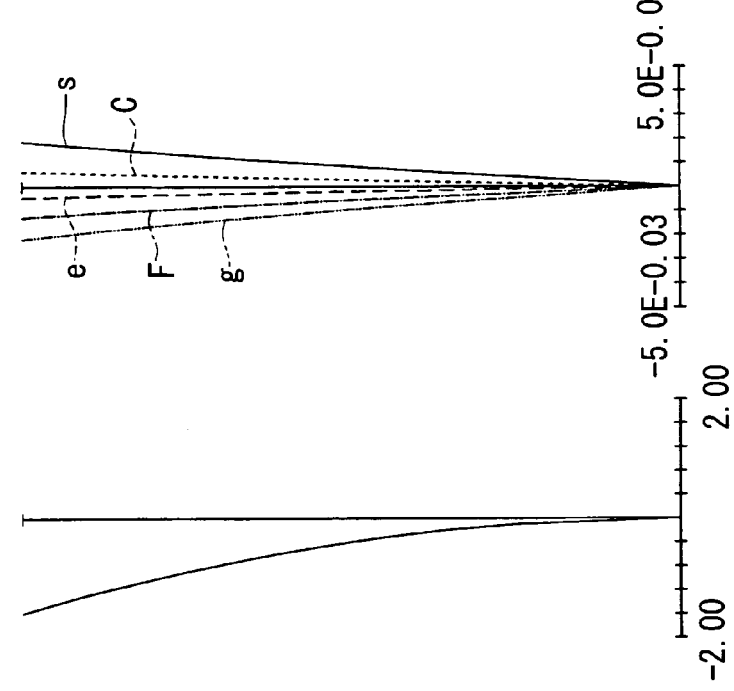

COMPACT OBJECTIVE OPTICAL SYSTEM AND EXAMINATION APPARATUS

BACKGROUND OF THE INVENTION

1. Field of the Invention

The present invention relates to a compact objective optical system having a long, thin shape and to an examination apparatus using the same, and more particularly, to an optical system that is inserted into an animal such as a mammal to perform in-vivo examination at high resolution and to an examination apparatus using the same.

This application is based on Japanese Patent Application No. 2005-041130, the content of which is incorporated herein by reference.

2. Description of Related Art

There are techniques in which a dye or fluorescent marker is attached to specific molecules, tissue, cells, and so on and fluorescence microscopes, confocal laser-scanning microscopes, and the like are used to examine the behavior of the molecules in the cells and tissue of living organisms.

The behavior of molecules in a live individual mammalian organism, such as a mouse, may differ from that in cultured cells. Therefore, examination of biological tissue and the interior of cells is carried out while the individual organism is alive (in-vivo).

When examining the interior of a living organism, because the outer diameter of the objective lens in conventional microscopes is large, it is necessary to make a large incision in the living organism to carry out examination. Making a large incision in a living organism, however, is highly invasive, and therefore long-term examination is impossible. An endoscope with a small diameter that is suitable for cellular examination with high magnification is proposed in Japanese Unexamined Patent Application Publication No. 2004-313772. Also, an objective optical system with a high numerical aperture, small outer diameter, and comparatively long overall length is disclosed in United States Patent Application No. 2004/0051957A1. With these objective optical systems, if a small hole is formed in the living organism and this optical system is inserted through the hole, it is possible to carry out examination of the living organism with minimal invasiveness.

However, because the overall optical-system length in the objective optical system disclosed in Japanese Unexamined Patent Application Publication No. 2004-313772 is small, it is difficult to insert the objective lens to the position of an internal organ that is deep inside the living organism. Also, this objective optical system suffers from the problem that the observation range is too small to examine changes at the tissue level.

Furthermore, the objective optical system disclosed in United States Patent Application No. 2004/0051957A1 does not sufficiently correct chromatic aberrations. Therefore, when carrying out white-light observation or fluorescence observation with this objective optical system, the wavelengths of excitation light and fluorescence produced in the specimen differ, which results in the problem of low resolution. This is a problem particularly when carrying out fluorescence observation using a confocal optical system, because the brightness of the fluorescence detected is low if the chromatic aberrations are not corrected.

BRIEF SUMMARY OF THE INVENTION

The present invention has been conceived in light of the circumstances described above, and an object thereof is to realize an objective optical system, as well as an examination apparatus using the same, in which the outer diameter is reduced, the overall length is increased, and chromatic aberrations are well-corrected and which is suitable for in-vivo examination with a sufficiently long length and a wide observation range.

In order to realize the object described above, the present invention provides the following solutions.

In order to examine a site deep within a living organism with minimal invasiveness to a small laboratory animal, such as a mouse or the like, it is preferable that the diameter of lens groups in the objective optical system be 1.5 mm or less. In particular, in order to further reduce the invasiveness to tissue to be examined within 3 mm from the tip of the objective optical system, the outer diameter of the lens should be 1.2 mm or less.

To monitor an image captured with the objective optical system, it is necessary to connect a relay lens and CCD after the objective lens and to monitor the image slightly away from the living organism. The overall length of the optical system from the object plane to the image plane of the objective optical system should be 10 mm or more so that the relay lens and CCD do not touch the animal (its head or the like). Furthermore, in order to observe changes at the tissue level, the examination region should be 0.5 mm or more in diameter.

The present invention provides a compact objective optical system comprising, in order from an object side, a first lens group with positive power; a second lens group including a compound lens; a third lens group formed of a biconvex lens; a fourth lens group, with positive power, including a compound lens; and a fifth lens group with positive power, wherein joining surfaces of the compound lens included in the second lens group and the compound lens included in the fourth lens group have negative power.

According to the present invention, the first lens group having positive power reduces the divergence angle of divergent light from the object and serves the role of a field lens for locating the entrance pupil position farther away. The joining face of the compound lens included in the second lens group 2 has negative power and, at this point, corrects on-axis chromatic aberration generated mainly in the third lens group. The third lens group, which is formed of the biconvex lens, substantially collimates divergent light from the object, which passes through the first lens group and the second lens group. In the fourth lens group, which includes a compound lens, the joining surface of the compound lens has negative power and, at this point, corrects spherical aberration and comatic aberrations generated mainly in the third lens group. It also converges the substantially collimated light that has passed through the third lens group. Furthermore, the fifth lens group having positive power images the light from the fourth lens group onto the image plane and plays the role of a field lens for locating the exit pupil position farther away.

With such a configuration, an objective optical system whose outer diameter is reduced, whose overall length is increased, whose chromatic aberrations are well-corrected and which is suitable for in-vivo examination is realized.

In the above-described compact objective optical system according to the present invention, conditional expression (1) below is preferably satisfied.

$$0.01 < |NA \cdot Ho/F_{13}| < 0.06 \tag{1}$$

Here, $F_{13}$ is a combined focal length from the first lens group to the third lens group, NA is a numerical aperture at the object side, and Ho is a maximum observation range.

With this configuration, it is possible to increase the overall length while keeping the outer diameter of the optical system small. Below the lower limit in conditional expression (1), the overall length becomes too short. Therefore, the power from the first lens group to the third lens group increases and the level of aberrations produced increases. If the upper limit is exceeded, the power from the first lens group to the third lens group is reduced and the beam diameter increased, and the outer diameter of the objective optical system thus becomes large. Therefore, the invasiveness to the animal is high.

In the above-described compact objective optical system according to the present invention, preferably, the compound lens included in the second lens group is a lens formed by joining a positive lens $L_{21}$ and a negative lens $L_{22}$ and is located close to an image-side focal position of the first lens group; and conditional expressions (2) and (3) below are satisfied.

$$v_{21} - v_{22} > 35 \quad (2)$$

$$20 < F_3 \cdot v_3 \cdot (n_{21} - n_{22})/|R_{2C}| < 60 \quad (3)$$

Here, $v_{21}$ and $v_{22}$ are Abbe numbers, at the d-line, of the positive lens $L_{21}$ and the negative lens $L_{22}$; $n_{21}$ and $n_{22}$ are refractive indexes, at the d-line, of the positive lens $L_{21}$ and the negative lens $L_{22}$, respectively; $v_3$ is the Abbe number, at the d-line, of the third lens group; $F_3$ is the focal length of the third lens group; and $R_{2C}$ is the radius of curvature of the joining surface of the positive lens $L_{21}$ and the negative lens $L_{22}$.

With this configuration, it is possible to properly correct the on-axis chromatic aberration produced mainly in the third lens group. By positioning the compound lens close to the image-side focal position of the first lens group, it is possible to correct the on-axis and off-axis aberrations with good balance. If $v_{21} - v_{22}$ in conditional expression (2) goes below 35, correction of the chromatic aberrations is not sufficiently accomplished. Below the lower limit in conditional expression (3), because the power of the joining surface of the second lens group is too weak, correction of the chromatic aberrations is not sufficiently accomplished. Also, when the upper limit is exceeded, because the power of the joining face is too strong, the chromatic aberrations are over-corrected. Furthermore, because the radius of curvature of the joining face is small, processing of the positive lens $L_{21}$ and the negative lens $L_{22}$ becomes difficult.

In the above-described compact objective optical system according to the present invention, preferably, the compound lens included in the second lens group has an air-contact surface which is a flat surface, and in the compound lens of the second lens group, the lens formed of a material with a higher dispersion is disposed at the image-plane side.

With this configuration, because one surface of the lens is a flat surface, the processing is simplified and costs are reduced. Also, by positioning the lens formed of the material with the higher dispersion at the image-plane side, it is possible to correct the on-axis chromatic aberration with the air-contact surface at the image-plane side.

In the above-described compact objective optical system according to the present invention, preferably, the compound lens included in the fourth lens group is a lens formed by joining a negative meniscus lens $L_{41}$ and a positive lens $L_{42}$ having convex surfaces at the object side, and conditional expression (4) below is satisfied.

$$0.3 < F_3 \cdot n_3 \cdot (n_{41} - n_{42})/|R_{4C}| < 0.7 \quad (4)$$

Here, $n_3$ is the refractive index, at the d-line, of the third lens group; $n_{41}$ and $n_{42}$ are the refractive indexes, at the d-line, of the negative meniscus lens $L_{41}$ and the positive lens $L_{42}$, respectively; $F_3$ is the focal length of the third lens group; and $R_{4C}$ is the radius of curvature of the joining surface of the negative meniscus lens $L_{41}$ and the positive lens $L_{42}$.

Conditional expression (4) is a condition for properly correcting the spherical aberration and the comatic aberration produced mainly in the third lens group.

With this configuration, below the lower limit in conditional expression (4), the spherical aberration and the comatic aberration are under-corrected. When the upper limit is exceeded, the spherical aberration and the comatic aberration are over-corrected.

The above-described compact objective optical system according to the present invention preferably further comprises an observation-direction converting optical element at the object side of the first lens group.

By providing the observation-direction converting optical element at the tip, it is possible to carry out examination in a plane other than a plane orthogonal to the longitudinal direction while keeping the diameter of the optical system small.

The above-described compact objective optical system according to the present invention preferably further comprises an observation-direction converting optical element between the first lens group and the second lens group.

It is possible to carry out examination in a plane other than a plane orthogonal to the longitudinal direction using the observation-direction converting optical element. Because the gap between the first lens group and the second lens group is large, it is possible to dispose the observation-direction conversion optical element at an angle relative to the longitudinal direction in order to carry out examination in an inclined direction.

The present invention provides an examination apparatus comprising a light source; an optical scanning unit for scanning the emission direction of light from the light source; an intermediate lens (intermediate optical system) for forming imaging the light emitted from the optical scanning unit; and an objective lens (compact objective optical system) for forming an intermediate image of an object, wherein the objective lens is formed of a first lens group having positive power, a second lens group including a compound lens, a third lens group formed of a biconvex lens, a fourth lens group having positive power and including a compound lens, and a fifth lens group having positive power, in this order from the object side, and joining surfaces of the compound lens included in the second lens group and the compound lens included in the fourth lens group have negative power.

With the examination apparatus according to the present invention, the first lens group, having positive power, of the objective lens reduces the divergence angle of diverging light from the object and thus plays the role of a field lens for locating the entrance pupil position farther away. The joining surface of the compound lens included in the second lens group has negative power and corrects, at this point, the on-axis chromatic aberration generated mainly in the third lens group. The third lens group, which is formed of the biconvex lens, substantially collimates the diverging light from the object, which has passed through the second lens group. In the fourth lens group including the compound lens, the joining surface of the compound lens has negative power and corrects, at this point, the spherical aberration and comatic aberration generated mainly in the third lens group. It also converges the substantially collimated light that has passed through the third lens group. Furthermore, the fifth lens group having positive power images the light from the fourth lens group onto the image place and plays the role of a field lens for locating the exit pupil position farther away.

With this configuration, an examination apparatus in which the outer diameter of an objective optical system is reduced, the overall length is increased, and the chromatic aberrations are well-corrected and which is suitable for in-vivo examination is realized.

In the above-described examination apparatus according to the present invention, conditional expression (1) below is preferably satisfied.

$$0.01 < |NA \cdot Ho/F_{13}| < 0.06 \quad (1)$$

Here, $F_{13}$ is the combined focal length from the first lens group to the third lens group, NA is the numerical aperture at the object side, and Ho is the maximum observation range.

With this configuration, it is possible to increase the overall length while keeping the outer diameter of the optical system small. Below the lower limit in conditional expression (1), the overall length becomes too short. Therefore, the power from the first lens group to the third lens group increases and the level of aberrations produced increases. If the upper limit is exceeded, the power from the first lens group to the third lens group is reduced and the beam diameter is increased, and the outer diameter of the objective optical system thus becomes large. Therefore, the invasiveness to the animal is high.

In the above-described examination apparatus according to the present invention, preferably, the compound lens included in the second lens group is a lens formed by joining a positive lens $L_{21}$ and a negative lens $L_{22}$ and is disposed close to an image-side focal position of the first lens group, and conditional expressions (2) and (3) below are satisfied.

$$\nu_{21} - \nu_{22} > 35 \quad (2)$$

$$20 < F_3 \cdot \nu_3 \cdot (n_{21} - n_{22})/|R_{2C}| < 60 \quad (3)$$

Here, $\nu_{21}$ and $\nu_{22}$ are Abbe numbers, at the d-line, of the positive lens $L_{21}$ and the negative lens $L_{22}$; $n_{21}$ and $n_{22}$ are refractive indexes, at the d-line, of the positive lens $L_{21}$ and the negative lens $L_{22}$, respectively; $\nu_3$ is the Abbe number, at the d-line, of the third lens group; $F_3$ is the focal length of the third lens group; and $R_{2C}$ is the radius of curvature of the joining surface of the positive lens $L_{21}$ and the negative lens $L_{22}$.

With this configuration, it is possible to properly correct the on-axis chromatic aberration produced mainly in the third lens group. By positioning the compound lens close to the image-side focal position of the first lens group, it is possible to correct the on-axis and off-axis aberrations with good balance. If $\nu_{21} - \nu_{22}$ in conditional expression (2) goes below 35, correction of the chromatic aberrations is not sufficiently accomplished. Below the lower limit in conditional expression (3), because the power of the joining surface of the second lens group is too weak, correction of the chromatic aberrations is not sufficiently accomplished. Also, when the upper limit is exceeded, because the power of the joining face is too strong, the chromatic aberrations are over-corrected. Furthermore, because the radius of curvature of the joining face is small, processing of the positive lens $L_{21}$ and the negative lens $L_{22}$ becomes difficult.

In the above-described examination apparatus according to the present invention, the compound lens included in the second lens group has an air-contact surface that is a flat surface, and in the compound lens of the second lens group, the lens formed of a material with higher dispersion is disposed at the image side.

With this configuration, because one surface of the lens is a flat surface, the processing is simplified and costs are reduced. Also, by positioning the lens formed of the material with the higher dispersion at the image-plane side, it is possible to correct the on-axis chromatic aberration with the air-contact surface at the image-plane side.

In the above-described examination apparatus according to the present invention, preferably the compound lens included in the fourth lens group is a lens formed by joining a negative meniscus lens $L_{41}$ having a convex surface at the object side and a positive lens $L_{42}$, and conditional expression (4) below is satisfied.

$$0.3 < F_3 \cdot n_3 \cdot (n_{41} - n_{42})/|R_{4C}| < 0.7 \quad (4)$$

Here, $n_3$ is the refractive index, at the d-line, of the third lens group; $n_{41}$ and $n_{42}$ are the refractive indexes, at the d-line, of the negative meniscus lens $L_{41}$ and the positive lens $L_{42}$, respectively; $F_3$ is the focal length of the third lens group; and $R_{4C}$ is the radius of curvature of the joining surface of the negative meniscus lens $L_{41}$ and the positive lens $L_{42}$.

Conditional expression (4) is a condition for properly correcting the spherical aberration and the comatic aberration produced mainly in the third lens group.

With this configuration, below the lower limit in conditional expression (4), the spherical aberration and the comatic aberration are under-corrected. When the upper limit is exceeded, the spherical aberration and the comatic aberration are over-corrected.

The above-described examination apparatus according to the present invention preferably further comprises an observation-direction converting optical element at the object side of the first lens group.

By providing the observation-direction converting optical element at the tip, it is possible to carry out examination in a plane other than a plane orthogonal to the longitudinal direction while keeping the outer diameter of the optical system small.

The above-described examination apparatus according to the present invention preferably further comprises an observation-direction converting optical element between the first lens group and the second lens group.

It is possible to carry out examination in a plane other than a plane orthogonal to the longitudinal direction using the observation-direction converting optical element. Because the gap between the first lens group and the second lens group is large, it is possible to dispose the observation-direction conversion optical element at an angle relative to the longitudinal direction in order to carry out examination in an inclined direction.

In the above-described examination apparatus according to the present invention, preferably, the light source includes a light source unit; an optical fiber for transmitting light that the light source unit emits; and a collimator optical system for collimating the light emitted from the optical fiber.

In this case, the light from the light source unit passes through the optical fiber to be guided to the collimator optical system and is collimated in this collimator optical system. Thereafter, the emission direction of the light is scanned by the optical scanning unit, and an image is formed at an intermediate image position by the intermediate lens.

The image formed by the intermediate lens is re-imaged onto the object by the objective lens to illuminate or excite the object.

Here, the core of the optical fiber functions as a pinhole; thus, when examining the object, because light from positions other than the vicinity of the site which is in focus is cut, examination can be carried out with a high SN ratio. Also, by changing the distance between the end faces of the collimator optical system and the optical fiber, it is possible to scan the examination position in the longitudinal direction (Z-direction) of the objective lens, and therefore it is also possible to acquire a three-dimensional image in associating with the scanning in the lateral directions (the X- and Y-directions) by the optical scanning unit.

In the above-described examination apparatus according to the present invention, a relay optical system may be disposed after the objective lens for collimating the light beam emitted from the object. With this configuration, it is possible to make the examination apparatus of the present invention compatible with infinity-design microscope systems.

Here, the relay optical system may be freely removed from the examination apparatus.

In this case, it is possible to exchange the relay optical system for one having a suitable configuration and shape, according to the optical configuration and application of the examination apparatus, which enables superior examination.

In the above-described examination apparatus according to the present invention, in order to carry out examination of a site deep within a living organism with minimal invasiveness to a small laboratory animal, such as a mouse or the like, the diameter of the lens groups in the objective optical system should be 1.5 mm or less. In particular, in order to further reduce the invasiveness to tissue which to be examined within 3 mm from the objective optical system, the outer diameter of the lenses should be 1.2 mm or less.

To monitor an image captured with the objective optical system, it is necessary to connect a relay lens and CCD after the objective lens and to monitor the image slightly away from the living organism. The overall length of the optical system from the object plane to the image plane of the objective optical system should be 10 mm or more so that the relay lens and CCD do not touch the animal (its head or the like). Furthermore, in order to observe changes at the tissue level, the examination region should be 0.5 mm or more in diameter.

With the present invention, an advantage is afforded in that it is possible to realize an objective optical system and an examination apparatus in which the outer diameter is reduced, the overall length is increased, and chromatic aberrations are well corrected and which is suitable for in-vivo examination with a sufficiently long length and a wide observation range.

BRIEF DESCRIPTION OF THE SEVERAL VIEWS OF THE DRAWINGS

FIG. 5A is an aberration plot showing spherical aberration of the compact objective optical system in FIG. 4.

FIG. 5B is an aberration plot showing astigmatism of the compact objective optical system in FIG. 4.

FIG. 5C is an aberration plot showing distortion of the compact objective optical system in FIG. 4.

FIG. 5D is an aberration plot showing lateral chromatic aberration of the compact objective optical system in FIG. 4.

FIG. 5E is an aberration plot showing comatic aberration of the compact objective optical system in FIG. 4.

FIG. 5F is an aberration plot showing comatic aberration of the compact objective optical system in FIG. 4.

FIG. 7A is an aberration plot showing spherical aberration of the compact objective optical system in FIG. 6.

FIG. 7B is an aberration plot showing astigmatism of the compact objective optical system in FIG. 6.

FIG. 7C is an aberration plot showing distortion of the compact objective optical system in FIG. 6.

FIG. 7D is an aberration plot showing lateral chromatic aberration of the compact objective optical system in FIG. 6.

FIG. 9A is an aberration plot showing spherical aberration of the compact objective optical system in FIG. 8.

FIG. 9B is an aberration plot showing astigmatism of the compact objective optical system in FIG. 8.

FIG. 9C is an aberration plot showing distortion of the compact objective optical system in FIG. 8.

FIG. 9D is an aberration plot showing lateral chromatic aberration of the compact objective optical system in FIG. 8.

FIG. 11A is an aberration plot showing spherical aberration of the compact objective optical system in FIG. 10.

FIG. 11B is an aberration plot showing astigmatism of the compact objective optical system in FIG. 10.

FIG. 11C is an aberration plot showing distortion of the compact objective optical system in FIG. 10.

FIG. 11D is an aberration plot showing lateral chromatic aberration of the compact objective optical system in FIG. 10.

DETAILED DESCRIPTION OF THE INVENTION

Figure 1:
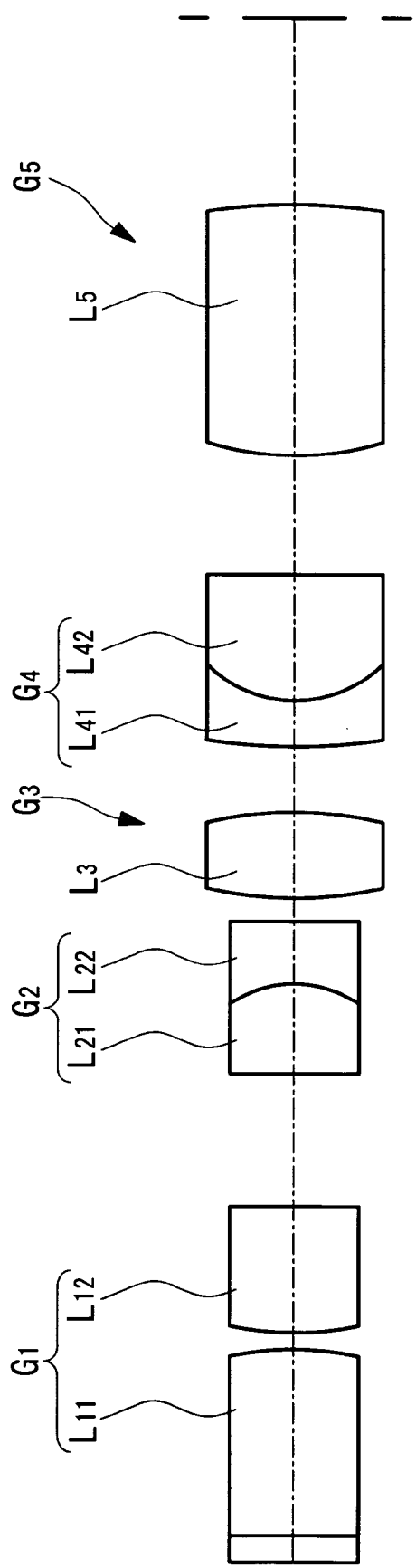
FIG. 1 is a diagram showing the lens arrangement of a compact objective optical system according to an embodiment of the present invention.

An embodiment of a compact objective optical system according to the present invention will be described below with reference to FIGS. 1 to 3.

A compact objective optical system 1 according to this embodiment, which is used as the objective lens in an examination apparatus such as a fluorescence microscope, a confocal laser-scanning microscope, or the like, is formed of a first lens group $G_1$ with positive power; a second lens group $G_2$ including a compound lens; a third lens group $G_3$ formed of a biconvex lens $L_3$; a fourth lens group $G_4$ with positive power, including a compound lens; and a fifth lens group $G_5$ with positive power, in this order from the object side. The joining surfaces of the compound lens included in the second lens group $G_2$ and the compound lens included in the fourth lens group $G_4$ both have negative powers.

More concretely, the first lens group $G_1$ is formed of a plano-convex lens $L_{11}$ with a convex surface facing the image-plane side and a plano-convex lens $L_{12}$ with a convex surface facing the object side. The first lens group $G_1$ has positive power overall. The second lens group $G_2$ is formed of a compound lens in which a plano-convex lens $L_{21}$ with a convex surface facing the image-plane side and a plano-concave lens $L_{22}$ with a concave surface facing the object side are joined.

The third lens group $G_3$ is formed of the biconvex lens $L_3$. The fourth lens group $G_4$ is formed of a compound lens in which a negative meniscus lens $L_{41}$ with a convex surface facing the object side and a plano-convex lens $L_{42}$ with a convex surface facing the object side are joined. Because the refractive index of the negative meniscus lens $L_{41}$ is higher than that of the plano-convex lens $L_{42}$, the joining surface has negative power. The fourth lens group $G_4$ has positive power overall. The fifth lens group $G_5$ is formed of a biconvex lens $L_5$ and has positive power.

In this embodiment, each lens is formed so as to satisfy conditional expressions (1) to (4) shown below.

$$0.01 < |NA \cdot Ho/F_{13}| < 0.06 \quad (1)$$

$$\nu_{21} - \nu_{22} > 35 \quad (2)$$

$$20 < F_3 \cdot \nu_3 \cdot (n_{21} - n_{22})/|R_{2C}| < 60 \quad (3)$$

$$0.3 < F_3 \cdot n_3 \cdot (n_{41} - n_{42})/|R_{4C}| < 0.7 \quad (4)$$

Here, $F_{13}$ is the combined focal length of the first lens group $G_1$ to the third lens group $G_3$; NA is the numerical aperture at the object side; Ho is the maximum observation range; $\nu_{21}$ and $\nu_{22}$ are the Abbe numbers, at the d-line, of the positive lens $L_{21}$ and the negative lens $L_{22}$; $n_{21}$ and $n_{22}$ are the refractive indexes, at the d-line, of the positive lens $L_{21}$ and the negative lens $L_{22}$, respectively; $\nu_3$ is the Abbe number, at the d-line, of the third lens group $G_3$; $F_3$ is the focal length of the third lens group $G_3$; $R_{2c}$ is the radius of curvature of the joining surface of the positive lens $L_{21}$ and the negative lens $L_{22}$; $n_3$ is the refractive index, at the d-line, of the third lens group $G_3$; $n_{41}$ and $n_{42}$ are the refractive indexes, at the d-line, of the negative meniscus lens $L_{41}$ and the positive lens $L_{42}$, respectively; and $R_{4c}$ is the radius of curvature of the joining surface of the negative meniscus lens $L_{41}$ and the positive lens $L_{42}$.

The operation of the compact objective optical system 1 according to this embodiment, having such a configuration, will be described below.

By forming the first lens group $G_1$ of the plano-convex lens $L_{11}$ and the plano-convex lens $L_{12}$ and by placing the flat surface at the object side of the plano-convex lens $L_{11}$, it is possible to ensure that no air pockets enter. The convex surface at the image side of the plano-convex lens $L_{11}$ ensures that a near-aplanatic condition is met and enables the occurrence of spherical aberration and comatic aberration to be reduced. Thus, the divergence angle of the pencil of rays from the object can be reduced and it is possible to provide the role of a field lens for setting the entrance pupil position farther away.

Also, the second lens group $G_2$ including the compound lens is formed of the plano-convex lens $L_{21}$ and the plano-concave lens $L_{22}$, and the compound lens is positioned in the vicinity of the image-side focal position of the first lens group $G_1$.

Because the refractive index of the plano-convex lens $L_{21}$ is lower than that of the plano-concave lens $L_{22}$, the joining surface has negative power. The plano-concave lens $L_{22}$ uses glass having a higher dispersion than that of the plano-convex lens $L_{21}$.

Furthermore, because the plano-convex lens $L_{21}$ and the plano-concave lens $L_{22}$ are formed to satisfy conditional expressions (2) and (3), it is possible to properly correct axial chromatic aberration produced mainly in the third lens group $G_3$ with the joining surface of the plano-convex lens $L_{21}$ and the plano-concave lens $L_{22}$. It is also possible to correct on-axis chromatic aberration at the flat surface (air-contact surface) at the image side of the plano-concave lens $L_{22}$.

Making one surface of the lenses forming the second lens group $G_2$ flat in this way simplifies the fabrication of these lenses and reduces costs.

The third lens group $G_3$ formed of the biconvex lens $L_3$ substantially collimates the pencil of rays from the object which have passed through the first lens group $G_1$ and the second lens group $G_2$.

In the fourth lens group $G_4$ including the compound lens formed of the negative meniscus lens $L_{41}$ and the plano-convex lens $L_{42}$, because the refractive index of the negative meniscus lens $L_{41}$ is higher than that of the plano-convex lens $L_{42}$, the joining surface has negative power. The negative meniscus lens $L_{41}$ and the plano-convex lens $L_{42}$ are formed to satisfy conditional expression (4), which allows spherical aberration and comatic aberration produced mainly in the third lens group $G_3$ to be corrected with the joining surface of the negative meniscus lens $L_{41}$ and the plano-convex lens $L_{42}$. Furthermore, the substantially collimated light passing through the third lens group $G_3$ is converged in the fourth lens group $G_4$.

In the fifth lens group $G_5$ having positive power, which is formed of the biconvex lens $L_5$, light from the fourth lens group $G_4$ is imaged onto the image plane, thus performing the role of a field lens for setting the exit pupil position farther away.

Because this embodiment is constructed to satisfy conditional expressions (1) to (4), the outer diameter of the optical system can be kept small, and it is possible to realize an optical system with a long overall length.

Figure 2:
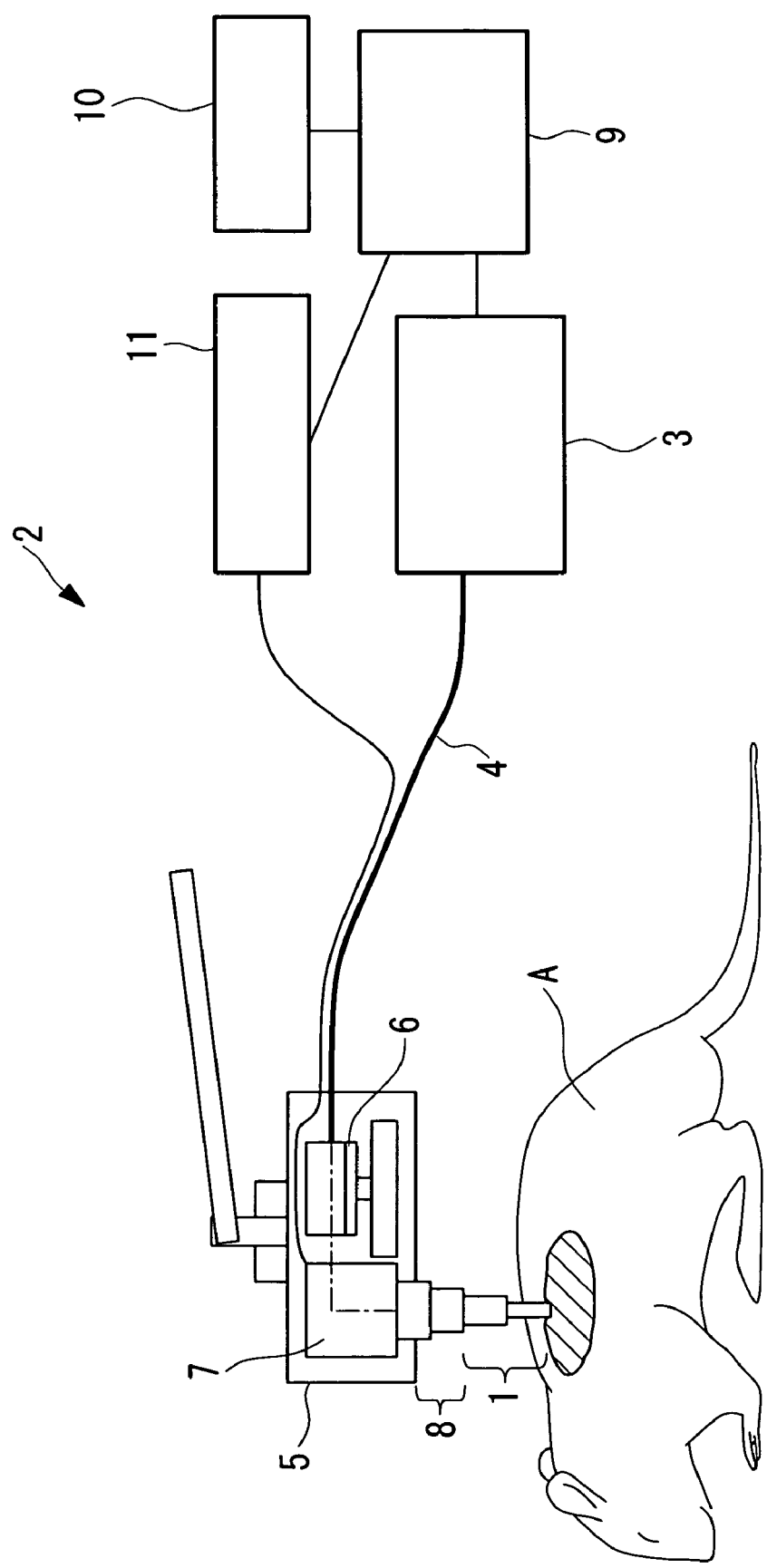
FIG. 2 is a diagram showing an example of an examination apparatus in which the compact objective optical system of FIG. 1 is connected to a compact laser-scanning optical system.

FIG. 2 shows an example of an examination apparatus in which the compact objective optical system 1 according to this embodiment is connected to a compact laser-scanning optical system 2.

In an optical unit 3, an excitation laser (light source unit, not shown) is provided as a light source, and laser light is guided to a scanning unit 5 via an optical fiber 4 and is collimated in a collimator optical system 6. Thereafter, the exit direction of the light is scanned in an optical scanning unit 7, and an image is formed at an intermediate image position by a pupil-projection optical system 8 (intermediate lens).

The pupil-projection optical system 8 and the compact objective optical system 1 are connected, and the image formed by the pupil-projection optical system 8 is re-imaged at an object (living organism) A by the compact objective optical system 1 shown in FIG. 1 to excite the object (biological tissue, dye, etc.) A. Fluorescence generated in the object (living organism) A passes through the compact objective optical system 1, the pupil-projection optical system 8, the optical scanning unit 7, the collimator optical system 6, and the optical fiber 5, and after being split off from the excitation light by a dichroic mirror (not shown), in the optical unit 3, it passes through an excitation-light cutting filter (not shown in the drawings), is detected by a detector (not shown in the drawing), is captured in a computer 9, and is displayed on a monitor 10.

In this embodiment, the core of the optical fiber 4 serves as a pinhole, and when examining the object A, because light from regions other than the vicinity of the part that is in focus is cut, it is possible to carry out examination with a high SN ratio. Also, by changing the distance between collimator optical system 6 and the end face of the optical fiber 4 in the scanning unit 5 by operating a control unit 11, it is possible to scan the examination position in the longitudinal direction (Z-direction) of the compact objective optical system 1. Therefore, it is also possible to acquire a three-dimensional image in association with the scanning in the lateral directions (X- and Y-directions) by the optical scanning unit 7.

By increasing the overall length of the optical system from the tip of the compact objective optical system 1 of this embodiment to the image plane, even though the pupil-projection optical system 8 and scanning unit 5 are connected behind the compact objective optical system 1, it is difficult for the pupil-projection optical system 8 or the scanning unit 5 to touch the animal.

Figure 3:
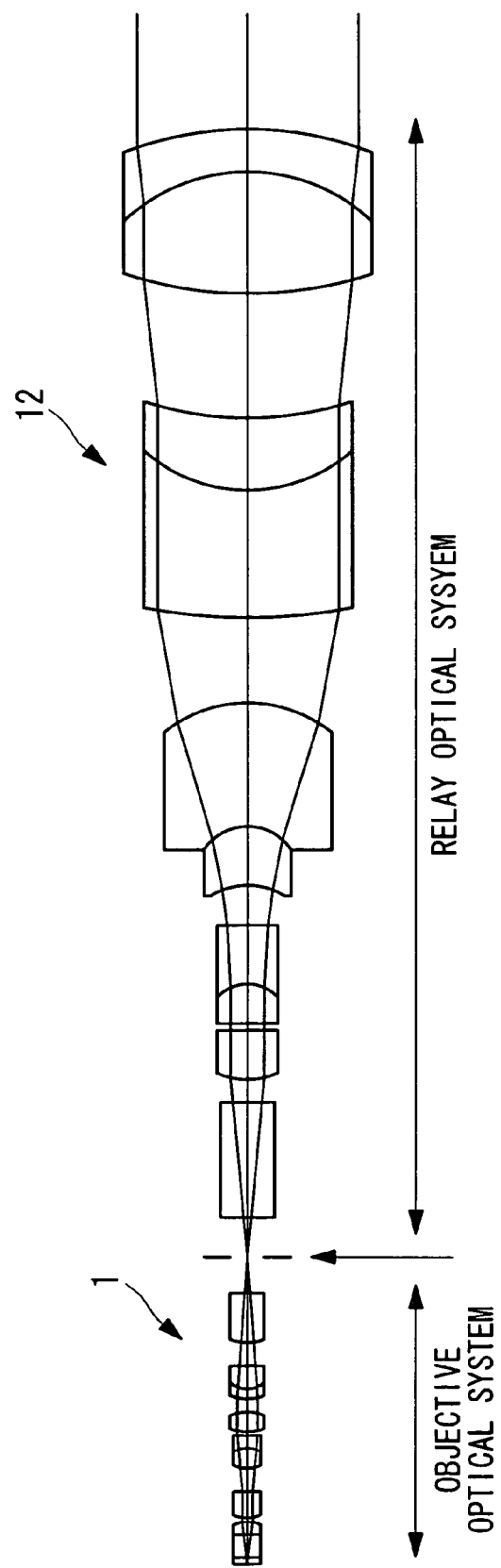
FIG. 3 is a diagram showing an example of an examination apparatus in which a relay optical system is disposed behind the objective optical system of FIG. 1 and which collimates a light beam emitted from an object.

FIG. 3 shows an example of an examination apparatus in which a relay optical system 12 is disposed behind the compact objective optical system 1 in FIG. 1 and which collimates a beam of light emitted from the object.

With this configuration, the compact objective optical system 1 according to this embodiment can be made compatible with infinity-design microscope systems. At this time, if the beam diameter at the end of the relay optical system 12 is designed to be narrow, as shown in FIG. 3, it is possible to insert the optical system to a deeper location inside the living organism with minimal invasiveness.

Furthermore, the relay optical system 12 in this examination apparatus may have a configuration that enables it to be attached and detached. In such a case, it is possible to exchange the relay optical system 12 for one having a suitable construction and shape according to the optical configuration and application of the examination apparatus, which makes it possible to carry out the desired examination.

Next, examples of the compact objective optical system 1 according to this embodiment will be described.

In the description of each example, the pupil position at the object side is ∞. Also, all examples are designed as water-immersion optical systems (optical systems where water is provided between the object surface and the objective optical system).

In the examples, symbol r is the radius of curvature (in units of millimeters), symbol d is the distance between surfaces (in units of millimeters), symbol n is the refractive index at the d-line (587.56 nm), and symbol ν is the Abbe number $\nu = (n-1)/(n_F - n_C)$, where $n_F$ and $n_C$ indicate the refractive indexes at the F-line and the C-line, respectively.

FIRST EXAMPLE

Figure 4:
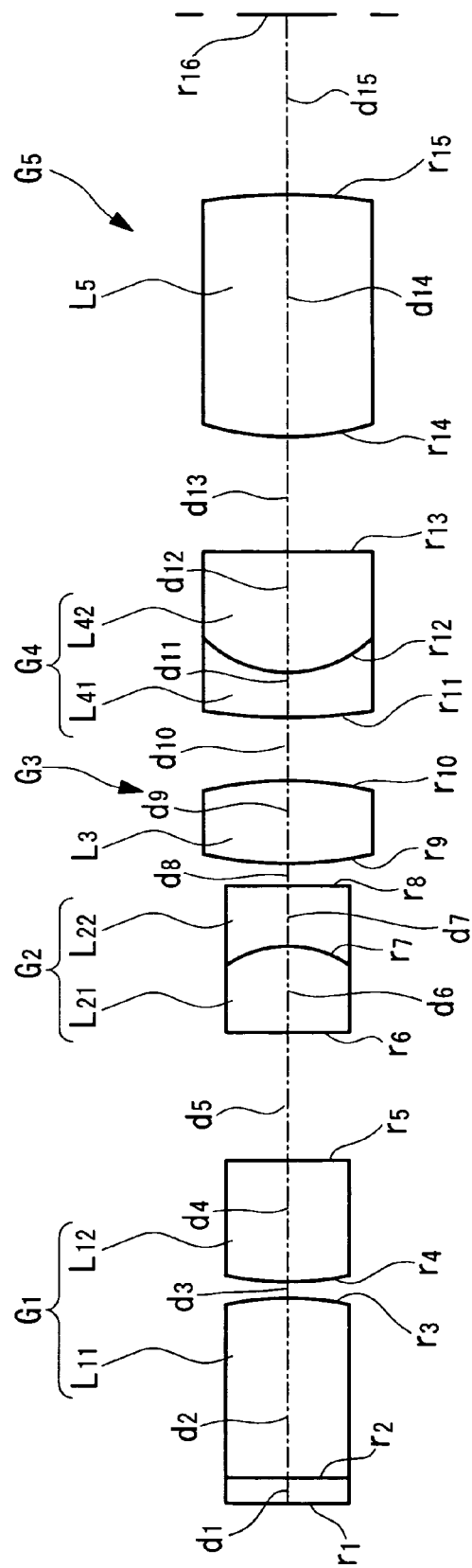
FIG. 4 is a lens arrangement diagram showing a first example of the compact objective optical system in FIG. 1.

FIG. 4 shows the lens arrangement of a first Example of the compact objective optical system 1, and Table 1 shows lens data of the compact objective optical system 1 according to this Example. FIGS. 5A to 5F show aberration plots for the compact objective optical system 1 of this Example. FIG. 5A shows spherical aberration, FIG. 5B shows astigmatism, FIG. 5C shows distortion, FIG. 5D shows lateral chromatic aberration, and FIGS. 5E and 5F show comatic aberrations. In FIGS. 5A to 5F, symbol NA indicates the numerical aperture at the image side, symbol y indicates the image height, symbol M indicates the meridional plane, and symbol S indicates the sagittal plane. The lateral chromatic aberration shown in FIG. 5 is based on the d-line (587.56 nm).

TABLE 1

| SURFACE NUMBER | r | d | n | ν |
|---|---|---|---|---|
| 1 | ∞ (OBJECT SURFACE) | 0.2 | 1.33304 (WATER) | 55.89 |
| 2 | ∞ | 1.51 | 1.51633 | 64.14 |
| 3 | −3.002 | 0.13 | 1 | |
| 4 | 2.256 | 1 | 1.6134 | 44.27 |
| 5 | ∞ | 1.08 | 1 | |
| 6 | ∞ | 0.71 | 1.43875 | 94.93 |
| 7 | −0.942 | 0.5 | 1.6134 | 44.27 |
| 8 | ∞ | 0.2 | 1 | |
| 9 | 2.908 | 0.7 | 1.51633 | 64.14 |
| 10 | −2.908 | 0.55 | 1 | |
| 11 | 4.827 | 0.36 | 1.7725 | 49.6 |
| 12 | 0.942 | 1 | 1.6779 | 55.34 |
| 13 | ∞ | 0.99 | 1 | |
| 14 | 2.532 | 2 | 1.51633 | 64.14 |
| 15 | −8.456 | 1.51 | 1 | |
| 16 | ∞ (IMAGINARY SURFACE) | | | |

The compact object optical system 1 according to this Example is constructed only of lenses with extremely small diameters; that is, the lens diameters of the plano-convex lens $L_{11}$ to the plano-convex lens $L_{22}$ are 1 mm and those of the biconvex lens $L_3$ to the biconvex lens $L_5$ are 1.4 mm. Accordingly, the compact objective optical system 1 according to this Example is suitable for examining a site deep inside a living organism with minimal invasiveness to a small animal, such as a mouse or the like.

The compact objective optical system 1 according to this Example has an overall optical system length from the tip to the image plane of 12.24 mm; thus, even if a relay lens or CCD is connected after the compact objective optical system 1 to display an image on the monitor, this construction makes it is difficult for the relay lens or CCD to touch the animal (its head or the like). Also, it is possible to carry out examination over a wide region with a diameter of 0.674 mm. In addition, because on-axis chromatic aberration and lateral chromatic aberration can be well corrected, the compact objective optical system 1 is suitable for use in white-light observation or fluorescence observation, particularly in laser-scanning confocal optical microscope objectives.

The working distance (WD) is 0.2 mm; by bringing the tip of the compact objective optical system 1 into close contact with the living organism, it is possible to carry out blur-free examination of the interior of the living organism.

SECOND EXAMPLE

Next, a second Example of the compact objective optical system 1 will be described below.

Figure 6:
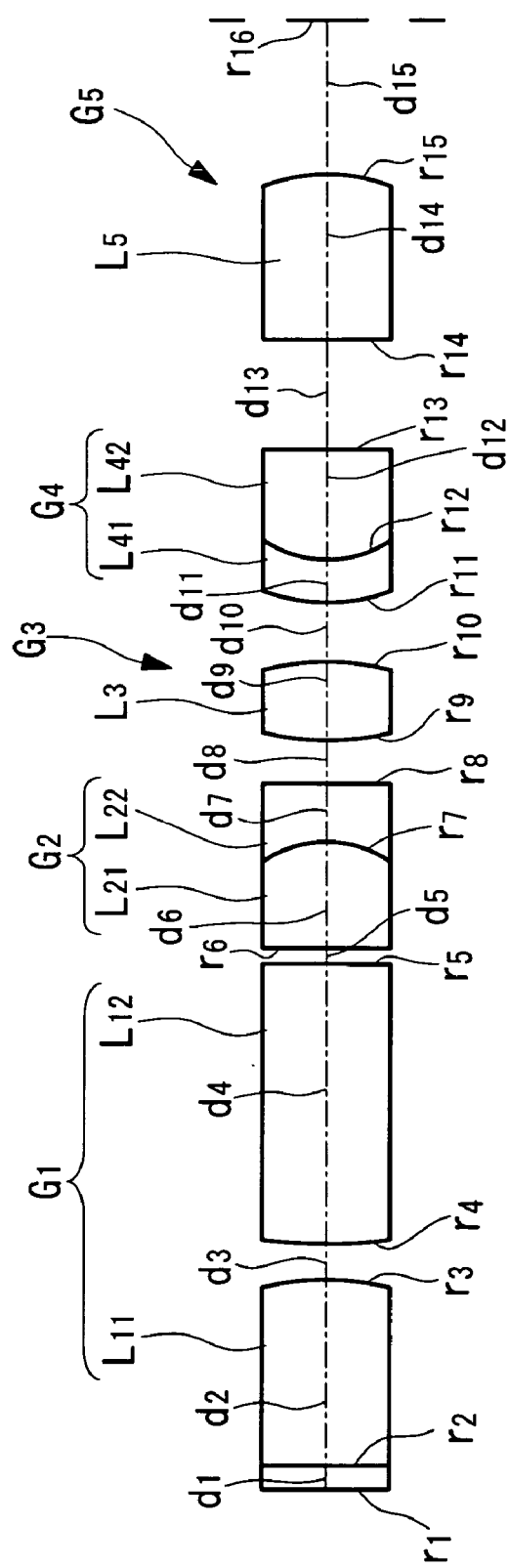
FIG. 6 is a lens arrangement diagram showing a second example of the compact objective optical system in FIG. 1.
Figure 7F:
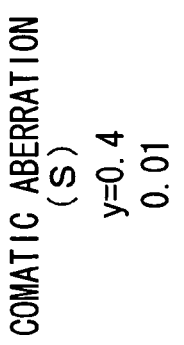
FIG. 7F is an aberration plot showing comatic aberration of the compact objective optical system in FIG. 6.
Figure 7E:
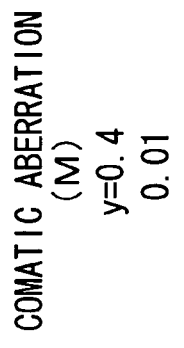
FIG. 7E is an aberration plot showing comatic aberration of the compact objective optical system in FIG. 6.

FIG. 6 shows the lens arrangement of the compact objective optical system 1 according to this Example, and Table 2 shows the lens data of the compact objective optical system 1 according to this Example. FIGS. 7A to 7F are aberration plots for the compact objective optical system 1 of this Example. FIG. 7A shows the spherical aberration, FIG. 7B shows astigmatism, FIG. 7C shows distortion, FIG. 7D shows lateral chromatic aberration, and FIGS. 7E and 7F show comatic aberrations. The symbols in FIGS. 7A to 7F are the same as those in the first Example.

TABLE 2

| SURFACE NUMBER | r | d | n | ν |
|---|---|---|---|---|
| 1 | ∞ (OBJECT SURFACE) | 0.2 | 1.33304 (WATER) | 55.89 |
| 2 | ∞ | 1.66 | 1.51633 | 64.14 |
| 3 | −3.102 | 0.33 | 1 | |
| 4 | 3.281 | 2.5 | 1.6134 | 44.27 |
| 5 | ∞ | 0.15 | 1 | |
| 6 | ∞ | 1 | 1.43875 | 94.93 |
| 7 | −0.942 | 0.51 | 1.6134 | 44.27 |
| 8 | INF | 0.4 | 1 | |
| 9 | 3.102 | 0.7 | 1.51633 | 64.14 |
| 10 | −3.102 | 0.55 | 1 | |
| 11 | 1.961 | 0.36 | 1.7725 | 49.6 |
| 12 | 0.942 | 1 | 1.51633 | 64.14 |
| 13 | ∞ | 0.99 | 1 | |
| 14 | ∞ | 1.5 | 1.51633 | 64.14 |
| 15 | −2.385 | 1.43 | 1 | |
| 16 | ∞ (IMAGINARY SURFACE) | | | |

The compact objective optical system 1 according to this Example is basically the same as that in the first Example, but the observation range is larger (0.8 mm in diameter) and the overall length is longer (13.08 mm) than those in the first Example.

The arrangement, symbols, and function of the lenses are the same as those in the first Example; however, by increasing the thickness of the plano-convex lens $L_{12}$ in the first lens group $G_1$ in this Example, the overall length can be increased. The lens diameters are all 1.2 mm.

In this Example too, conditions (1) to (4) are satisfied, the outer diameter is reduced, the overall length is increased, and the chromatic aberration is well-corrected, thus realizing a compact objective optical system 1 which is suitable for in-vivo examination with a sufficiently increased length and wide observation range. Because the optical system of this Example has a longer overall length than the first Example, it is more suitable for examining a site deep inside a living organism with minimal invasiveness to a small animal, such as a mouse or the like. With this Example too, it is possible to connect a laser-scanning optical system or a relay optical system, similarly to the first Example.

THIRD EXAMPLE

Next, a third Example of the compact objective optical system 1 will be described below.

Figure 8:
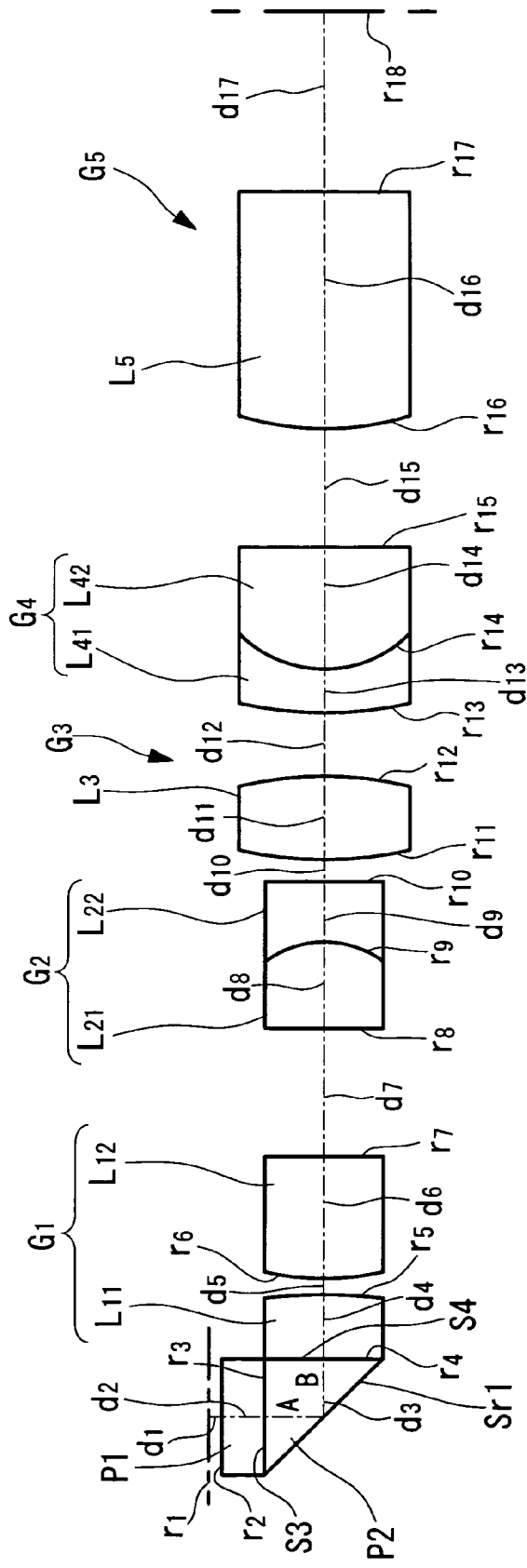
FIG. 8 is a lens arrangement diagram showing a third example of the compact objective optical system in FIG. 1.
Figure 9F:
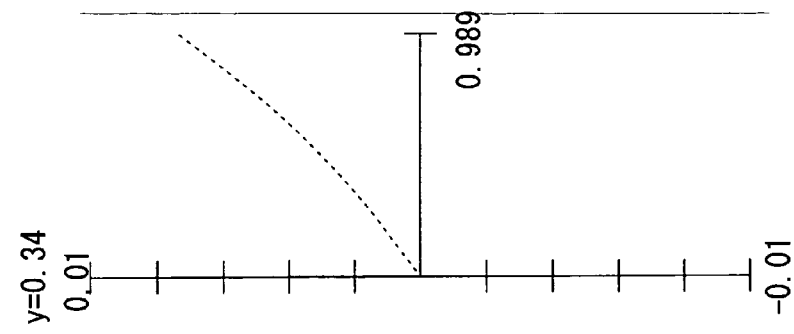
FIG. 9F is an aberration plot showing comatic aberration of the compact objective optical system in FIG. 8.
Figure 9E:
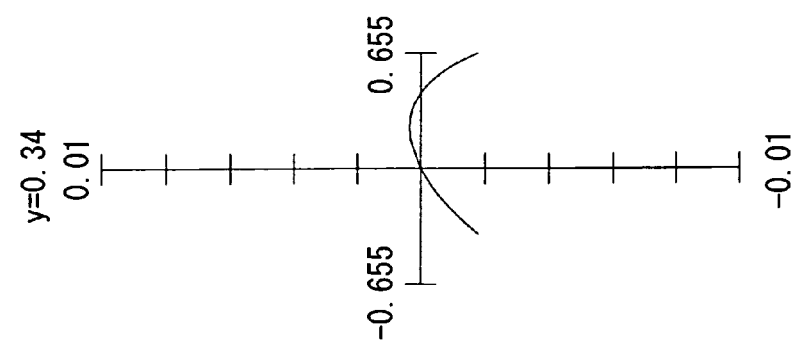
FIG. 9E is an aberration plot showing comatic aberration of the compact objective optical system in FIG. 8.

FIG. 8 shows the lens arrangement of the compact objective optical system 1 according to this Example, and Table 3 shows the lens data for the compact objective optical system 1 according to this Example. FIGS. 9A to 9F show aberration plots for the compact objective optical system 1 of this Example. FIG. 9A shows spherical aberration, FIG. 9B shows astigmatism, FIG. 9C shows distortion, FIG. 9D shows lateral chromatic aberration, and FIGS. 9E and 9F show comatic aberrations. The symbols in FIGS. 9A to 9F are the same as those in the first Example.

TABLE 3

| SURFACE NUMBER | r | d | n | ν |
|---|---|---|---|---|
| 1 | ∞ (OBJECT SURFACE) | 0.1 | 1.33304 (WATER) | 55.79 |
| 2 | ∞ | 0.34 | 1.51633 | 64.14 |
| 3 | ∞ (PRISM) | 1 | 1.7725 | 49.6 |
| 4 | ∞ | 0.5 | 1.7725 | 49.6 |
| 5 | −4.48 | 0.13 | 1 | |
| 6 | 2.256 | 1 | 1.6134 | 44.27 |
| 7 | ∞ | 1.08 | 1 | |
| 8 | ∞ | 0.71 | 1.43875 | 94.93 |
| 9 | −0.942 | 0.5 | 1.6134 | 44.27 |
| 10 | ∞ | 0.2 | 1 | |
| 11 | 2.908 | 0.7 | 1.51633 | 64.14 |
| 12 | −2.908 | 0.55 | 1 | |
| 13 | 4.827 | 0.36 | 1.7725 | 49.6 |
| 14 | 0.942 | 1 | 1.6779 | 55.34 |
| 15 | ∞ | 0.99 | 1 | |
| 16 | 2.532 | 2 | 1.51633 | 64.14 |
| 17 | −8.456 | 1.51 | 1 | |
| 18 | ∞ (IMAGINARY SURFACE) | | | |

In this Example, a parallel flat plate $P_1$ and a prism $P_2$, which is an observation-direction converting optical element, are disposed at the end of an optical system substantially the same as that in the first Example.

A surface $S_3$ and a surface $S_4$ of the prism $P_2$ are at right angles, and a surface $Sr_1$ is tilted at an angle of 45° with respect to the surface $S_3$ and the surface $S_4$. Furthermore, the parallel flat plate $P_1$, the right-angle prism $P_2$, and a plano-convex lens $L_{11}$ of a first lens group $G_1$ of the compact objective optical system 1 are bonded to each other. Length A on the optical axis inside the prism $P_2$ shown in the figure is 0.5 mm, and length B is 0.5 mm.

With the third Example of the compact objective optical system 1 having such a configuration, after passing through the parallel flat plate $P_1$, light emitted from the object enters the prism $P_2$, is totally reflected at the surface $Sr_1$ of the prism $P_2$, and is deflected by 90°. Thereafter, it enters the compact objective optical system 1. With this configuration, it is possible to carry out examination in a direction orthogonal to the longitudinal direction of the optical system. The other effects of the compact objective optical system 1 are the same as those in the first Example.

In this Example too, conditions (1) to (4) are satisfied, the outer diameter is reduced, the overall length is increased, and the chromatic aberration is well-corrected, thus realizing a compact objective optical system which is suitable for in-vivo examination with a sufficiently increased length and wide observation range.

With this Example too, it is possible to connect a laser-scanning optical system and a relay optical system, similarly to the first Example and the second Example.

FOURTH EXAMPLE

Next, a fourth Example of the compact objective optical system 1 will be described below.

Figure 10:
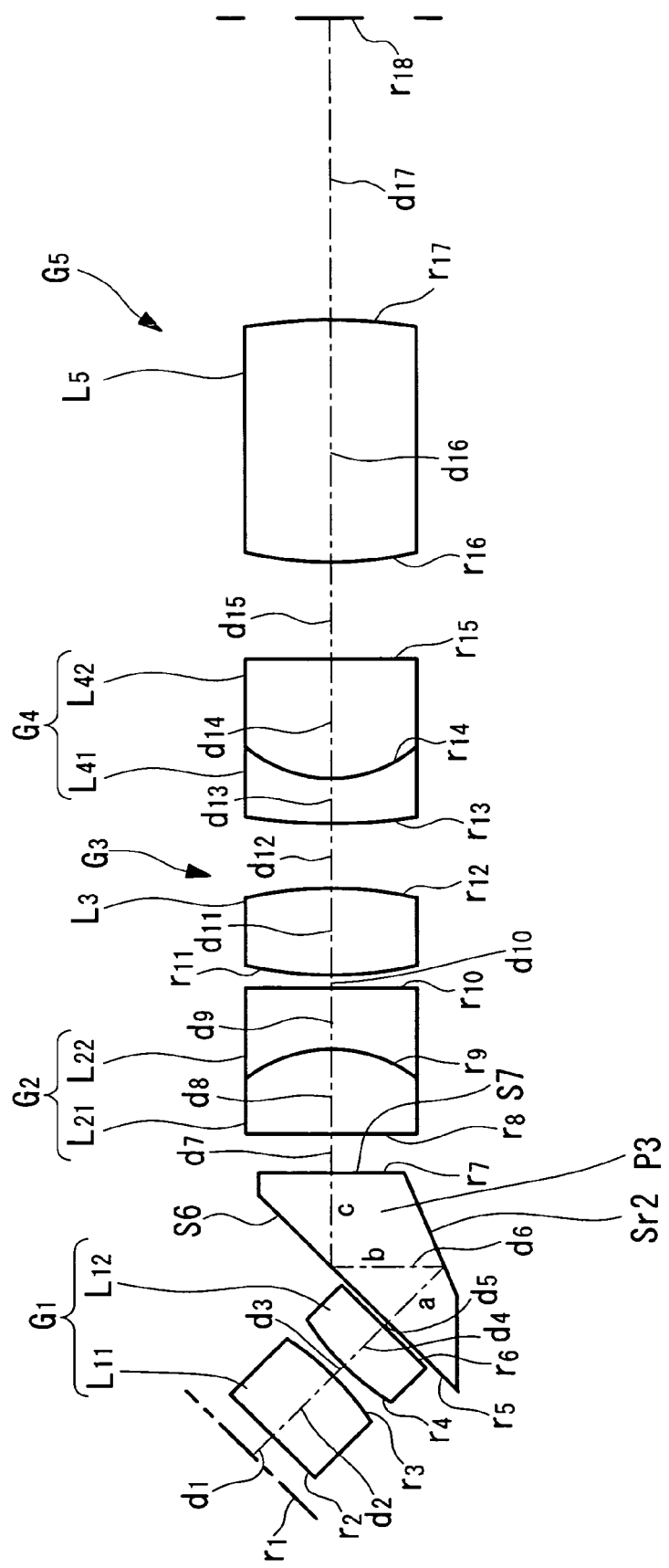
FIG. 10 is a lens arrangement diagram showing a fourth example of the compact objective optical system in FIG. 1.
Figure 11E:
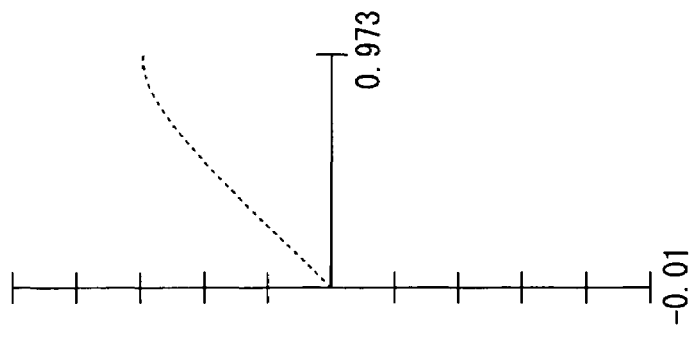
FIG. 11E is an aberration plot showing comatic aberration of the compact objective optical system in FIG. 10.
Figure 11F:
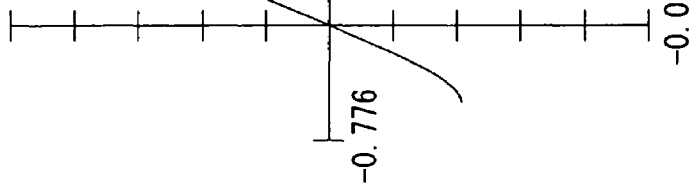
FIG. 11F is an aberration plot showing comatic aberration of the compact objective optical system in FIG. 10.

FIG. 10 shows the lens arrangement of the compact objective optical system 1 according to this Example, and Table 4 shows lens data of the compact objective optical system 1 according to this Example. FIGS. 11A to 11F show aberration plots for the compact objective optical system 1 of this Example. FIG. 11A shows spherical aberration, FIG. 11B shows astigmatism, FIG. 11C shows distortion, FIG. 11D shows lateral chromatic aberration, and FIGS. 11E and 11F show comatic aberrations. The reference numerals in FIGS. 11A to 11F are the same as those in the first Example.

TABLE 4

| SURFACE NUMBER | r | d | n | ν |
|---|---|---|---|---|
| 1 | ∞ (OBJECT SURFACE) | 0.2 | 1.33304 (WATER) | 55.79 |
| 2 | ∞ | 0.7 | 1.51633 | 64.14 |
| 3 | −3.002 | 0.13 | 1 | |
| 4 | 2.256 | 0.45 | 1.6134 | 44.27 |
| 5 | ∞ | 0.05 | 1 | |
| 6 | ∞(PRISM) | 2.32 | 1.7725 | 49.6 |
| 7 | ∞ | 0.31 | 1 | |
| 8 | ∞ | 0.71 | 1.43875 | 94.93 |
| 9 | −1.009 | 0.5 | 1.6134 | 44.27 |
| 10 | ∞ | 0.1 | 1 | |
| 11 | 3.709 | 0.7 | 1.603 | 65.44 |
| 12 | −3.709 | 0.55 | 1 | |
| 13 | 4.827 | 0.36 | 1.7725 | 49.6 |
| 14 | 1.009 | 1 | 1.6779 | 55.34 |
| 15 | ∞ | 0.8 | 1 | |
| 16 | 2.532 | 2 | 1.51633 | 64.14 |
| 17 | −8.456 | 2.51 | 1 | |
| 18 | ∞ (IMAGINARY SURFACE) | | | |

In this Example, a 45-degree prism $P_3$, which is an observation-direction converting optical element, is disposed between a first lens group $G_1$ and a second lens group $G_2$ of the compact objective optical system 1.

A surface $S_6$ and a surface $S_7$ of the prism $P_3$ form an angle of 45°, and the surface $S_6$ and a surface $Sr_2$ form an angle of 22.5°. The surface $Sr_2$ of the prism $P_3$ is coated with a metal thin film or a multilayer film. The lengths on the optical axis inside the prism $P_3$ shown in the figure are a=0.639 mm, b=0.904 mm, and c=0.774 mm.

Light emitted from the object passes through a plano-convex lens $L_{11}$ (whose convex surface faces the image side) and a plano-convex lens $L_{12}$ (a piano-convex lens whose convex surface faces the object side) of the first lens group $G_1$ with positive power, and then passes through the surface $S_6$ of the 45-degree prism $P_3$, which is the observation-direction converting optical element. The light that passes through the surface $S_6$ is reflected at the surface $Sr_2$ of the prism $P_3$ and is then totally reflected at the surface $S_6$. The light that is totally reflected at the surface $S_6$ passes through the surface $S_7$ and then passes through a compound lens (a piano-convex lens $L_{21}$ and a piano-concave lens $L_{22}$) in a second lens group $G_2$, a third lens group $G_3$, which is a biconvex lens $L_3$, a compound lens (a negative meniscus lens $L_{41}$ and a plano-convex lens $L_{42}$) in a fourth lens group $G_4$, and a fifth lens group $G_5$ with positive power, and forms an image. With this configuration, it is possible to carry out examination in a 45-degree frontward direction with respect to the longitudinal direction of the optical system.

The functions of the lens groups $G_1$ to $G_5$ are the same as those in the first Example.

In this Example too, conditions (1) to (4) are satisfied, the outer diameter is reduced, the overall length is increased, and the chromatic aberration is well-corrected, thus realizing a compact objective optical system which is suitable for in-vivo examination with a sufficiently increased length and wide observation range.

With this Example too, it is possible to connect a laser-scanning optical system and a relay optical system, similarly to the first to third Examples.

It is also possible to connect an image fiber bundle and CCD to the compact objective optical system of this invention (the first to fourth Examples) to carry out bright-field examination. Available methods include a method in which an illumination fiber is provided immediately outside the compact objective optical system for illuminating the organism, and a relay lens and half-mirror are provided after the compact objective optical system for making the illumination light incident along the same axis as the compact objective optical system.

Table 5 shows values of the conditional expressions (1) to (4) in the first to fourth Examples. In all cases, it is clear that conditional expressions (1) to (4) are satisfied.

TABLE 5

| PARAMETER | FIRST EXAMPLE | SECOND EXAMPLE | THIRD EXAMPLE | FOURTH EXAMPLE |
|---|---|---|---|---|
| NA | 0.149 | 0.125 | 0.149 | 0.136 |
| Ho (mm) | 0.674 | 0.800 | 0.674 | 0.674 |
| F13 (mm) | 3.036 | 3.821 | 3.035 | 2.990 |
| F3 (mm) | 2.936 | 3.124 | 2.936 | 3.189 |
| ν21 | 94.93 | 94.93 | 94.93 | 94.93 |
| ν22 | 44.27 | 44.27 | 44.27 | 44.27 |
| ν3 | 64.14 | 64.14 | 64.14 | 65.44 |
| R2c (mm) | −0.942 | −0.942 | −0.942 | −1.009 |
| R4c (mm) | 0.942 | 0.942 | 0.942 | 1.009 |
| n21 | 1.439 | 1.439 | 1.439 | 1.439 |
| n22 | 1.613 | 1.613 | 1.613 | 1.613 |
| n3 | 1.516 | 1.516 | 1.516 | 1.603 |
| n41 | 1.773 | 1.773 | 1.773 | 1.773 |
| n42 | 1.678 | 1.678 | 1.678 | 1.678 |
| LATERAL MAGNIFICATION | −1.202 | −1.000 | −1.203 | −1.193 |
| THE OVERALL LENGTH OF THE OPTICAL SYSTEM (mm) | 12.24 | 13.08 | 12.57 | 13.19 |
| CONDITIONAL EXPRESSION (1) \|NA · Ho/F13\| | 0.033 | 0.026 | 0.033 | 0.031 |
| CONDITIONAL EXPRESSION (2) ν21 − ν22 | 50.66 | 50.66 | 50.66 | 50.66 |
| CONDITIONAL EXPRESSION (3) F3 · ν3 · (n21 − n22)/\|R2c\| | 34.9 | 37.1 | 34.9 | 36.1 |
| CONDITIONAL EXPRESSION (4) F3 · n3 · (n41 − n42)/\|R4c\| | 0.447 | 0.476 | 0.447 | 0.479 |

What is claimed is:

1. A compact objective optical system comprising, in order from an object side:
   a first lens group having positive power;
   a second lens group including a compound lens;
   a third lens group formed of a biconvex lens;
   a fourth lens group having positive power and including a compound lens; and
   a fifth lens group having positive power,
   wherein joining surfaces of the compound lens included in the second lens group and the compound lens included in the fourth lens group have negative powers.

2. A compact objective optical system according to claim 1, wherein conditional expression (1) below is satisfied:

$$0.01 < |NA \cdot Ho/F_{13}| < 0.06 \quad (1)$$

wherein $F_{13}$ is a combined focal length from the first lens group to the third lens group, NA is a numerical aperture at the object side, and Ho is a maximum observation range.

3. A compact objective optical system according to claim 1, wherein the compound lens included in the second lens group is a lens formed by joining a positive lens $L_{21}$ and a negative lens $L_{22}$ and is located close to an image-side focal position of the first lens group; and conditional expressions (2) and (3) below are satisfied:

$$\nu_{21} - \nu_{22} > 35 \quad (2)$$

$$20 < F_3 \cdot \nu_3 \cdot (n_{21} - n_{22})/|R_{2C}| < 60 \quad (3)$$

wherein $\nu_{21}$ and $\nu_{22}$ are Abbe numbers, at the d-line, of the positive lens $L_{21}$ and the negative lens $L_{22}$; $n_{21}$ and $n_{22}$ are refractive indexes, at the d-line, of the positive lens $L_{21}$ and the negative lens $L_{22}$, respectively; $\nu_3$ is the Abbe number, at the d-line, of the third lens group; $F_3$ is the focal length of the third lens group; and $R_{2C}$ is the radius of curvature of the joining surface of the positive lens $L_{21}$ and the negative lens $L_{22}$.

4. A compact objective optical system according to claim 1, wherein the compound lens included in the second lens group includes an air-contact surface formed of a flat surface, and in the compound lens of the second lens group the lens formed of a material with a higher dispersion is disposed at an image-plane side.

5. A compact objective optical system according to claim 1, wherein the compound lens included in the fourth lens group is a lens formed by joining a negative meniscus lens $L_{41}$ and a positive lens $L_{42}$ having convex surfaces at the object side are joined; and conditional expression (4) below is satisfied:

$$0.3 < F_3 \cdot n_3 \cdot (n_{41} - n_{42})/|R_{4C}| < 0.7 \quad (4)$$

wherein $n_3$ is the refractive index, at the d-line, of the third lens group; $n_{41}$ and $n_{42}$ are the refractive indexes, at the d-line, of the negative meniscus lens $L_{41}$ and the positive lens $L_{42}$; respectively; $F_3$ is the focal length of the third lens group; and $R_{4C}$ is the radius of curvature of the joining surface of the negative meniscus lens $L_{41}$ and the positive lens $L_{42}$.

6. A compact objective optical system according to claim 1, further comprising an observation-direction converting optical element at the object side of the first lens group.

7. A compact objective optical system according to claim 1, further comprising an observation-direction converting optical element between the first lens group and the second lens group.

8. A compact objective optical system according to claim 1, wherein the diameter of each lens group from the first lens group to the fifth lens group is 1.5 mm or less; the overall length from the object plane to the image plane is 10 mm or more; and the observation field is 0.5 mm or more in diameter.

9. An examination apparatus comprising:
   a light source;
   an optical scanning unit for scanning the emission direction of light from the light source;
   an intermediate lens for imaging the light emitted from the optical scanning unit; and
   an objective lens for forming an intermediate image of an object;
   wherein the objective lens is formed of a first lens group having positive power, a second lens group including a compound lens; a third lens group formed of a biconvex lens, a fourth lens group having positive power and including a compound lens, and a fifth lens group having positive power, in this order from the object side, and
   joining surfaces of the compound lens included in the second lens group and the compound lens included in the fourth lens group have negative powers.

10. An examination apparatus according to claim 9, wherein the objective lens satisfies conditional expression (1) below:

$$0.01 < |NA \cdot Ho/F_{13}| < 0.06 \quad (1)$$

where, $F_{13}$ is the combined focal length from the first lens group to the third lens group, NA is a numerical aperture at the object side, and Ho is the maximum observation range.

11. An examination apparatus according to claim 9, wherein the compound lens included in the second lens group is a lens formed by joining a positive lens $L_{21}$ and a negative lens $L_{22}$ and is disposed close to an image-side position of the first lens group; and conditional expressions (2) and (3) below are satisfied:

$$\nu_{21} - \nu_{22} > 35 \quad (2)$$

$$20 < F_3 \cdot \nu_3 \cdot (n_{21} - n_{22})/|R_{2C}| < 60 \quad (3)$$

where $\nu_{21}$ and $\nu_{22}$ are Abbe numbers, at the d-line, of the positive lens $L_{21}$ and the negative lens $L_{22}$; $n_{21}$ and $n_{22}$ are refractive indexes, at the d-line, of the positive lens $L_{21}$ and the negative lens $L_{22}$, respectively; $\nu_3$ is the Abbe number, at the d-line, of the third lens group; $F_3$ is the focal length of the third lens group; and $R_{2C}$ is the radius of curvature of the joining surface of the positive lens $L_{21}$ and the negative lens $L_{22}$.

12. An examination apparatus according to claim 9, wherein the compound lens included in the second lens group includes an air-contact surface formed of a flat surface, and in the compound lens of the second lens group, the lens formed of a material with higher dispersion is disposed at the image side.

13. An examination apparatus according to claim 9, wherein the compound lens included in the fourth lens group is a lens formed by joining a negative meniscus lens $L_{41}$ having a convex surface at the object side and a positive lens $L_{42}$, and conditional expression (4) below is satisfied:

$$0.3 < F_3 \cdot n_3 \cdot (n_{41} - n_{42})/|R_{4C}| < 0.7 \quad (4)$$

where $n_3$ is the refractive index, at the d-line, of the third lens group; $n_{41}$ and $n_{42}$ are the refractive indexes, at the d-line, of the negative meniscus lens $L_{41}$ and the positive lens $L_{42}$, respectively; $F_3$ is the focal length of the third lens group; and $R_{4C}$ is the radius of curvature of the joining surface of the negative meniscus lens $L_{41}$ and the positive lens $L_{42}$.

14. An examination apparatus according to claim 9, further comprising an observation-direction converting optical element a the object side of the first lens group.

15. An examination apparatus according to claim 9, further comprising an observation-direction converting optical element between the first lens group and the second lens group.

16. An examination apparatus according to claim 9 wherein the light source includes:
 a light source unit
 an optical fiber for transmitting light that the light source unit emits;
 and a collimator optical system for collimating the light emitted from the optical fiber.

17. An examination apparatus according to claim 9, further comprising:
 an imaging lens for converting the light emitted from the intermediate lens into collimated light; and
 a relay optical system, disposed at the object side of the imaging lens, for imaging the collimated light.

18. An examination apparatus according to claim 17, wherein the relay optical system is freely attached and detached.

19. An examination apparatus according to claim 9, wherein:
 the diameters of the lens groups from the first lens group to the fifth lens group are 1.5 mm or less;
 the overall length from the object plane to the image plane is 10 mm or more; and
 the observation field is 0.5 mm or more in diameter.

* * * * *